US010699179B1

(12) United States Patent
Yoon et al.

(10) Patent No.: US 10,699,179 B1
(45) Date of Patent: Jun. 30, 2020

(54) CONTACTLESS-TYPE METAL CARD HAVING AN ELECTROMAGNETIC WAVE ABSORPTION SHEET

(71) Applicant: BIOSMART CORPORATION, Seoul (KR)

(72) Inventors: Tae Ki Yoon, Cheonan-si (KR); Gi Hoon Choi, Asan-si (KR)

(73) Assignee: BIOSMART CORPORATION, Seoul (KR)

( * ) Notice: Subject to any disclaimer, the term of this patent is extended or adjusted under 35 U.S.C. 154(b) by 0 days.

(21) Appl. No.: 16/527,349

(22) Filed: Jul. 31, 2019

(30) Foreign Application Priority Data

Jun. 4, 2019  (KR) .......................... 10-2019-0066037

(51) Int. Cl.
*G06K 19/077* (2006.01)
*G06K 19/02* (2006.01)
*G06K 19/07* (2006.01)

(52) U.S. Cl.
CPC ..... *G06K 19/07722* (2013.01); *G06K 19/022* (2013.01); *G06K 19/0723* (2013.01); *G06K 19/07747* (2013.01); *G06K 19/07771* (2013.01); *G06K 19/07779* (2013.01)

(58) Field of Classification Search
None
See application file for complete search history.

(56) References Cited

U.S. PATENT DOCUMENTS

| 10,089,570 B2* | 10/2018 | Herslow | G01B 7/06 |
| 10,318,859 B2* | 6/2019 | Lowe | G06K 19/07794 |
| 10,583,683 B1* | 3/2020 | Ridenour | B42D 25/47 |
| 2015/0206047 A1* | 7/2015 | Herslow | G06K 19/07779 |
| | | | 235/492 |

FOREIGN PATENT DOCUMENTS

KR  20090054502  6/2009

\* cited by examiner

*Primary Examiner* — Kristy A Haupt
(74) *Attorney, Agent, or Firm* — Cantor Colburn LLP

(57) ABSTRACT

Provided is a contactless-type metal card with an electromagnetic wave absorption sheet. The contactless-type metal card may include: a metal body sheet made of a metal material; an antenna inlay sheet made of a synthetic resin material with an antenna mounted on one side thereof; an electromagnetic wave absorption sheet disposed between the metal body sheet and the antenna inlay sheet; an IC device for card mounted on the metal body sheet or the antenna inlay sheet and having terminals connected to two ends of the antenna; a first thermal adhesive sheet disposed between the metal body sheet and the electromagnetic wave absorption sheet; and a second thermal adhesive sheet disposed between the electromagnetic wave absorption sheet and the antenna inlay sheet. The electromagnetic wave absorption sheet is preferably formed by mixing a powder of materials having a property of absorbing an electromagnetic wave and a binder.

13 Claims, 7 Drawing Sheets

CONTACTLESS-TYPE METAL CARD HAVING AN ELECTROMAGNETIC WAVE ABSORPTION SHEET

BACKGROUND OF THE INVENTION

1. Field of the Invention

The present invention relates to a metal card, and more particularly, to a contactless-type metal card with one side made of a metal material, including an electromagnetic wave absorption sheet and an antenna inlay sheet, and capable of operating by allowing an antenna to communicate with an external card reader in a non-contact manner by using wireless RF communication.

2. Description of the Related Art

A credit card is used for identity verification, payment, granting of credit, and the like, and its shape and design are becoming brilliant for the purpose of artistic value and an accessory function. In addition, the shape and design of the credit card have become an important factor in selecting a credit card, along with services, discounts, and points of the credit card. Therefore, card manufacturers are making efforts to satisfy various needs of customers by devising cards that are remarkably brilliant not only in shape and design but also in functionality.

Korean Patent Laid-Open No. 10-2009-0054502 discloses a sheet for metal card and a metal card having the sheet. The metal card is configured to include a metal sheet for metal card and a fixing piece bonded to the metal sheet and allows users to feel a high quality of the card improved by a luster unique to a metal. These metal cards can exhibit a luster and texture of a metal. However, since the metal sheet interferes with wireless communication with the external card reader, the metal sheet cannot be applied to a card driven in a non-contact manner by the RF communication using an antenna and an Integrated Circuit (IC) device for non-contacting card. Therefore, there is a limitation in that the metal sheet is applied only to a card with an IC device for contacting card mounted and driven in such a manner that a card reader and a contact are in direct contact with each other.

In general, in a case where a metal plate moves in a magnetic field, a magnetic flux is changed in a portion of the metal plate, and as a result, an eddy current is generated in the corresponding region of the metal plate due to the change magnetic flux. On the other hand, in a case where a metal card is embedded with an antenna, a magnetic flux is changed due to a signal supplied from an embedded antenna or an external terminal device, and thus, an eddy current is generated in the metal sheet. A signal of the antenna for data transmission and reception is attenuated by the eddy current generated in the metal sheet, and thus, wireless communication using the antenna becomes difficult.

For this reason, there has been a problem in that it is not possible to use a non-contacting module providing wireless communication using an antenna fora metal card, which can exhibit a luster and texture unique to a metal. Therefore, in order to communicate data in a wireless manner, it is urgently required to develop a technology for a metal card with an antenna and an IC device for non-contacting card mounted thereon.

SUMMARY OF THE INVENTION

The present invention is to provide a contactless-type metal card with an electromagnetic wave absorption sheet can absorbs an electromagnetic wave generated by a metal body sheet mounted thereon, capable of enabling data transmission and reception in a wireless manner by using the antenna.

According to a first aspect of the present invention, there is provided a contactless-type metal card including: a metal body sheet made of a metal material; an antenna inlay sheet of which main body is made of a synthetic resin material and in which an antenna is mounted on one side thereof; an electromagnetic wave absorption sheet disposed between the metal body sheet and the antenna inlay sheet; and an IC device for card mounted on the metal body sheet or the antenna inlay sheet and having terminals connected to two ends of the antenna to be driven by an induced current supplied from the antenna, wherein the electromagnetic wave absorption sheet is a sheet prepared by mixing a powder of materials having a property of absorbing an electromagnetic wave and a binder and having a predetermined thickness.

Preferably, in the contactless-type metal card according to the first aspect, the electromagnetic wave absorption sheet may be configured by mixing 1 to 10 wt % of silicon (Si), 1 to 10 wt % of chromium (Cr), 70 to 90 wt % of iron (Fe), and 5 to 15 wt % of the binder.

Preferably, the contactless-type metal card according to the first aspect may further includes: a first thermal adhesive sheet disposed between the metal body sheet and the electromagnetic wave absorption sheet; and a second thermal adhesive sheet disposed between the electromagnetic wave absorption sheet and the antenna inlay sheet.

According to a second aspect of the present invention, a contactless-type metal card including: a metal body sheet made of metal material; an antenna inlay sheet made of a synthetic resin material with an antenna mounted on one side thereof; an electromagnetic wave absorption sheet disposed between the metal body sheet and the antenna inlay sheet; an IC device for card mounted on the metal body sheet or the antenna inlay sheet and having terminals connected to two ends of the antenna; a first thermal adhesive sheet disposed between the metal body sheet and the electromagnetic wave absorption sheet; and second thermal adhesive sheet disposed between the electromagnetic wave absorption sheet and the antenna inlay sheet, wherein the electromagnetic wave absorption sheet is a sheet prepared by mixing a powder of materials having a property of absorbing an electromagnetic wave and a binder and having a predetermined thickness and is configured by mixing 1 to 10 wt % of silicon (Si), 1 to 10 wt % of chromium (Cr) , 70 to 90 wt % of iron (Fe) , and 5 to 15 wt % of the binder.

In a metal card according to the present invention, an electromagnetic wave absorption sheet is disposed between a metal body sheet and an antenna inlay sheet, so that, when the metal card approaches an external card reader, an induced current is generated by the card reader, and thus, an IC device for card can RF communicate with the external card reader.

DETAILED DESCRIPTION OF THE PREFERRED EMBODIMENTS

In a metal card according to the present invention, an electromagnetic wave absorption sheet is disposed between a metal body sheet and an antenna inlay sheet, so that, when the metal card approaches an external card reader, an induced current is prevented from not being generated in the antenna by the metal body sheet, and the IC device for card can RF communicate with and the external card reader in a non-contacting manner.

Hereinafter, a structure of a contactless-type metal card according to a preferred embodiment of the present invention will be described in detail with reference to the accompanying drawings.

First Embodiment

Figure 1:
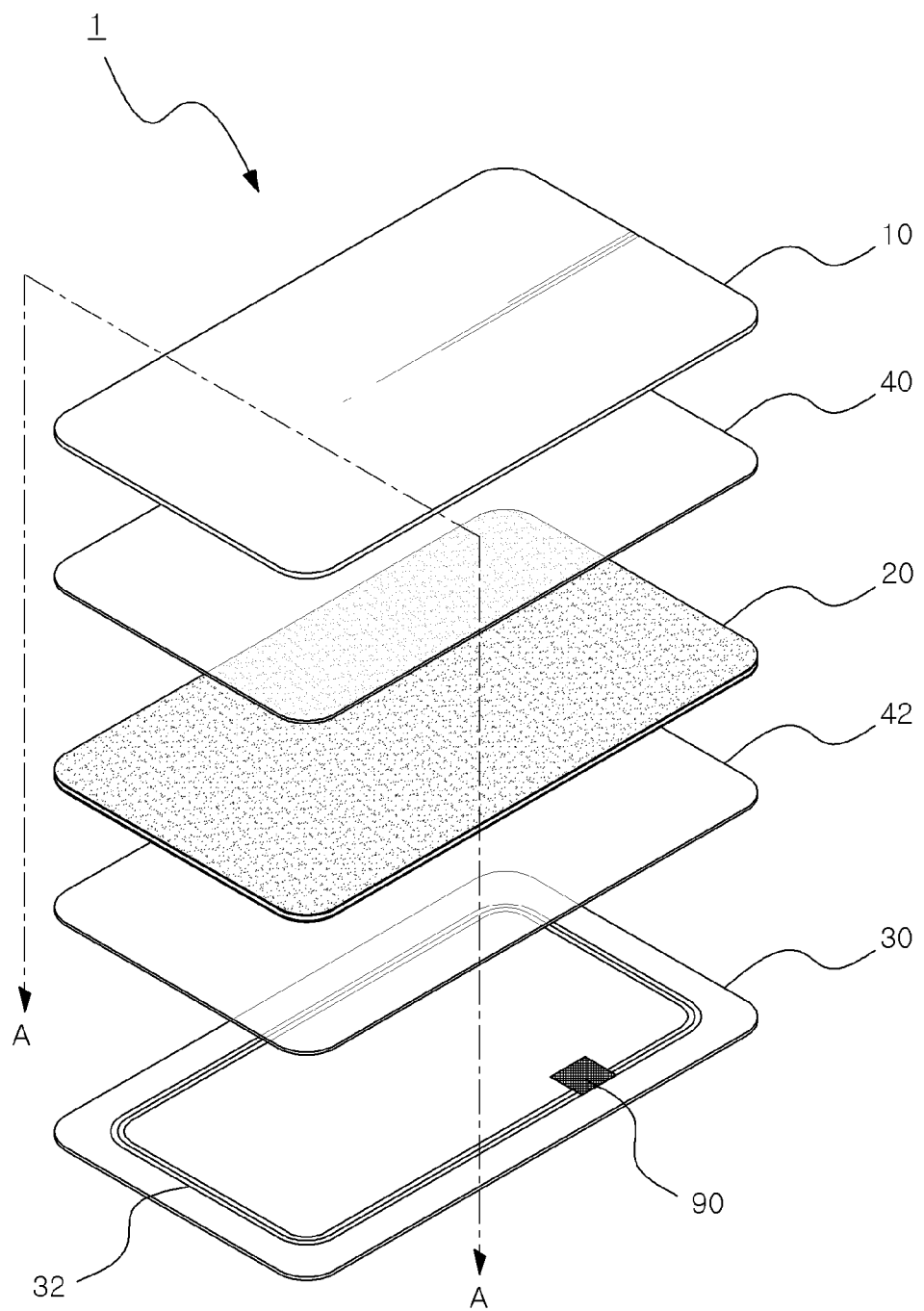
FIG. 1 is an exploded perspective view illustrating a contactless-type metal card according to a first embodiment of the present invention.
Figure 2:
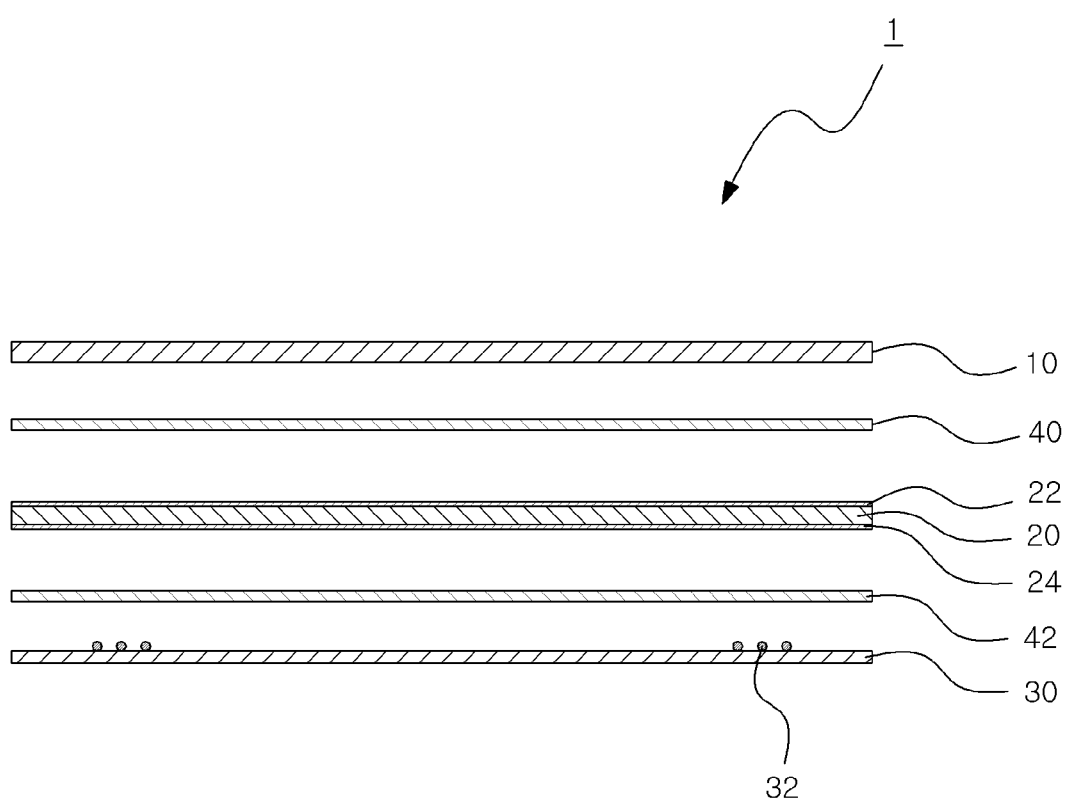
FIG. 2 is a cross-sectional view taken along line A-A of FIG. 1.

FIG. 1 is an exploded perspective view illustrating a contactless-type metal card according to a first embodiment of the present invention, and FIG. 2 is a cross-sectional view taken along line A-A of FIG. 1.

Referring to FIGS. 1 and 2, the contactless-type metal card 1 according to the first embodiment of the present invention is configured to include a metal body sheet 10, an electromagnetic wave absorption sheet 20, an antenna inlay sheet 30, an IC device for card 90, and first and second thermal adhesive sheets 40 and 42. The contactless-type metal card according to the first embodiment having the above-described configuration may be configured to be a credit card, a payment card, a secure card, an access control card, or the like. In addition, the contactless-type metal card may be configured to constitute a portion of such card as required.

The metal body sheet 10 is made of a metal material and has a flat plate shape. As the metal material, a steel such as SUS, gold, silver, copper, titanium, duraluminium, carbon, and the like may be used.

The antenna inlay sheet 30 is a sheet of which body is made of a synthetic resin material, and an antenna 32 formed as a closed loop by multiple winding is mounted on one surface of the antenna inlay sheet. The synthetic resin material used in the present invention may be one of polyvinyl chloride (PVC), polyethylene terephthalate (PET), polyethylene terephthalate glycols (PET-G), and polycarbonate (PC).

The electromagnetic wave absorption sheet 20 is a sheet prepared by mixing a powder of materials having a property of absorbing an electromagnetic wave and a binder and having a predetermined thickness. The electromagnetic wave absorption sheet 20 is disposed between the metal body sheet and the antenna inlay sheet. The electromagnetic wave absorption sheet 20 is preferably configured by mixing 1 to 10 wt % of silicon (Si), 1 to 10 wt % of chromium (Cr), 70 to 90 wt % of iron (Fe), and 5 to 15 wt % of the binder. The binder of the electromagnetic wave absorption sheet is preferably made of a urethane-series resin.

The thickness of the electromagnetic wave absorption sheet is preferably determined according to the communication performance at a communication frequency of the non-contacting card chip. Therefore, since the radio frequency used for the IC device for card is in a range of 13.56 MHz to 19 MHz, it is desirable to determine the thickness of the electromagnetic wave absorption sheet so as to enable RF communication at this communication frequency.

The first and second thermal adhesive sheets 40 and 42 are hot-melt sheets for adhering the upper and lower sheets by heating and pressing, respectively. The first and second thermal adhesive sheets 40 and 42 are disposed between the metal body sheet and the electromagnetic wave absorption sheet and between the electromagnetic wave absorption sheet and the antenna inlay sheet, respectively. Each of the first and second thermal adhesive sheets according to the present invention is preferably made of a thermoplastic polyester hot-melt sheet. Accordingly, in processes of manufacturing the metal card according to the present invention, the sheets constituting the metal card are sequentially stacked, and then heating and pressing are performed. Therefore, the metal body sheet, the electromagnetic wave absorption sheet, and the antenna inlay sheet can be adhered by first and second thermal adhesive sheets so as to be stably fixed.

On the other hand, instead of the first and second thermal adhesive sheets, thermosetting adhesives widely known to the ordinarily skilled as adhesives may be used.

Meanwhile, it is preferable to further include adhesion enhancement layers 22 and 24 formed by applying an adhesion enhancer to upper and lower surfaces of the electromagnetic wave absorption sheet to further increase the adhesion strength of the electromagnetic wave absorption sheet. The adhesion enhancer constituting the adhesion enhancement layer is preferably is configured with a urethane-series resin solution. The resin solution is prepared by dissolving the urethane-series resin component in a volatile solution or a dry solution and includes varnish.

The IC device for card 90 is an IC device for non-contacting card that RF-communicates with an external card reader and driven according to a predetermined program. The IC device for card 90 is mounted on the antenna inlay sheet 30, and the terminals thereof are connected to the two ends of the antenna. When the metal card according to the present invention approaches the external card reader, due to an induced electromotive force, an induced current is generated in the antenna 32 by the external card reader. The induced current generated in the antenna is supplied to the IC device for card, so that the IC device for card operates normally.

On the other hand, in the contactless-type metal card according to the first embodiment of the present invention described above, a combi IC device (combi chip) or a dual interface IC device (dual interface integrated chip) having both a non-contacting interface function for enabling RF communication with the external card reader and a contacting interface function for enabling communication through direct contact with terminals of the external card reader can be used as another example of the IC device for card.

Figure 3:
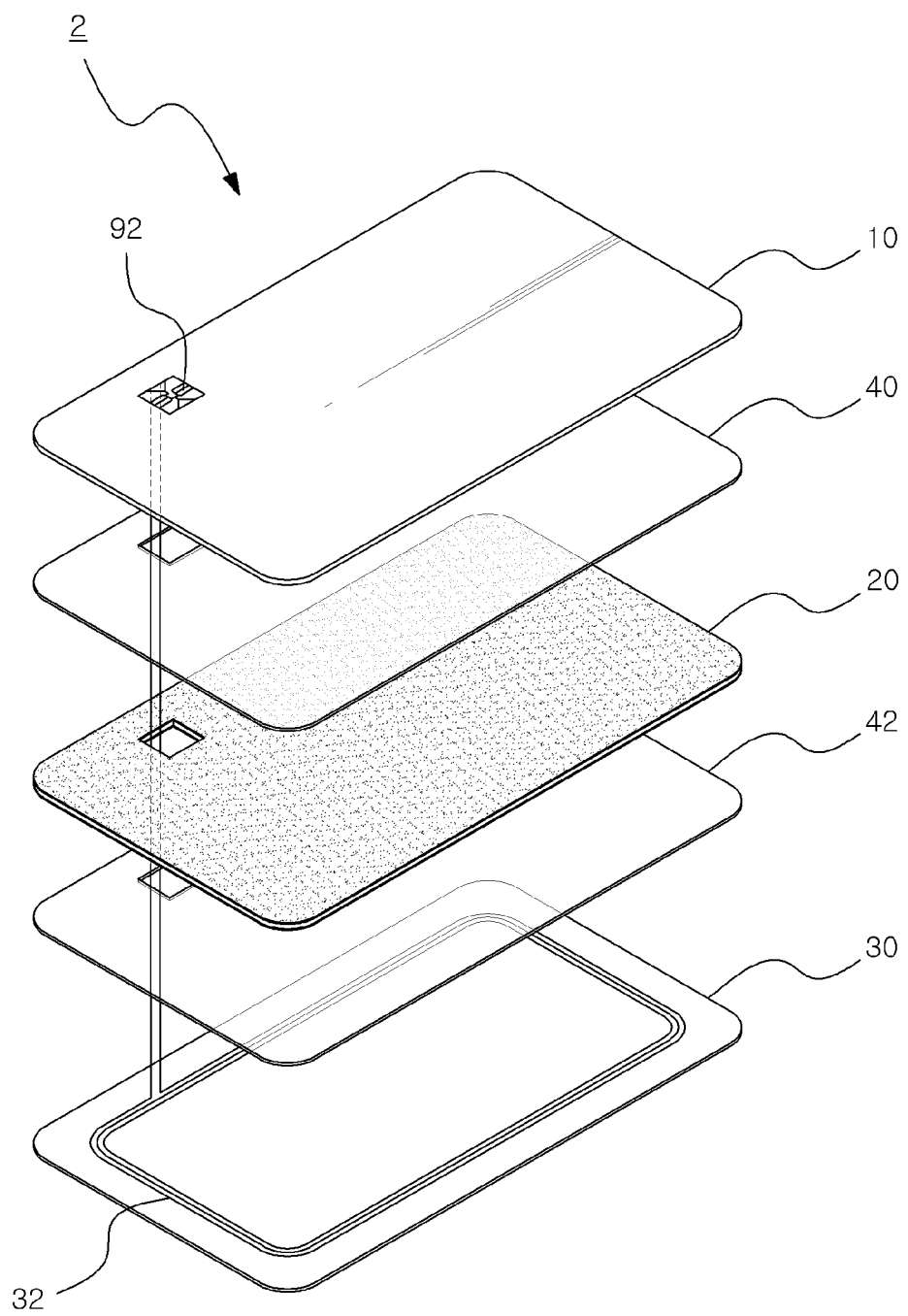
FIG. 3 is an exploded perspective view illustrating another example of an IC device for card in the contactless-type metal card according to the first embodiment of the present invention.

FIG. 3 is an exploded perspective view illustrating another example of the device for card of the contactless-type metal card according to the first embodiment of the present invention. Referring to FIG. 3, the contactless-type metal card 2 according to the first embodiment of the present invention may employ an IC device for card 92 as the dual interface IC device. In this case, the dual interface IC device 92 needs to be connected to the antenna of the antenna inlay sheet for the non-contacting interface with respect to the external card reader and to be exposed on the front surface of the card for the contacting interface with respect to the external card terminal device. Therefore, it is preferable that through holes are formed in each sheet constituting the metal card according to the present invention, the IC device for card is mounted in the space formed by the through holes, and the terminals of the IC device for card and the contacts of the antenna are connected to each other.

The contactless-type metal card 1 or 2 according to the first embodiment of the present invention having the above-described configuration illustrated in FIGS. 1 to 3 may be configured to a credit card or the like. In addition, the contactless-type metal card may be configured to constitute a portion of the credit card or the like as required.

Second Embodiment

Figure 4:
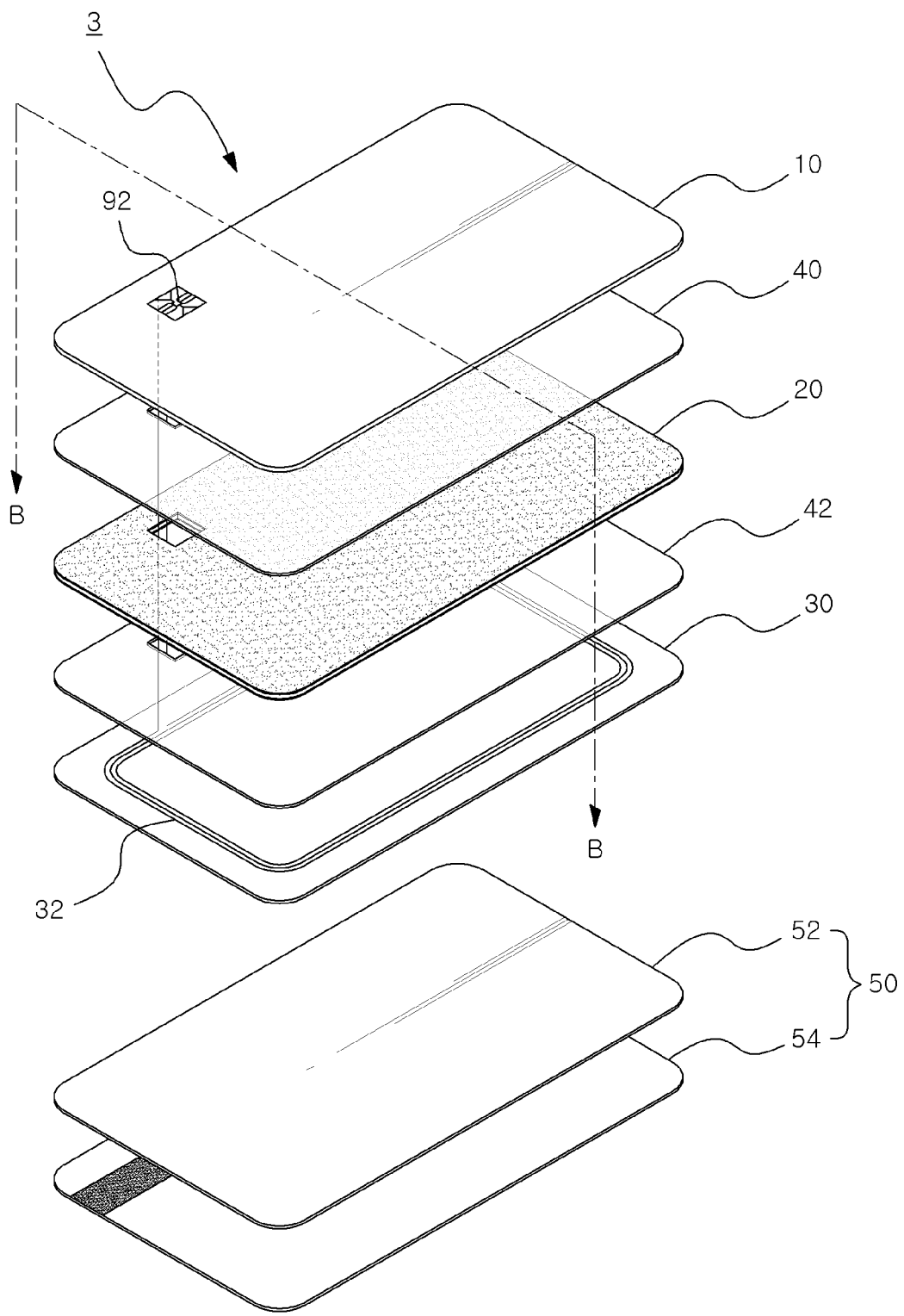
FIG. 4 is an exploded perspective view of a contactless-type metal card according to a second embodiment of the present invention.

Hereinafter, a structure and operations of a contactless-type metal card according to a second embodiment of the present invention will be described in detail with reference to FIGS. 4 and 5. FIG. 4 is an exploded perspective view of the contactless-type metal card according to the second embodiment of the present invention, and FIG. 5 is a cross-sectional view taken along line B-B of FIG. 4.

Figure 5:
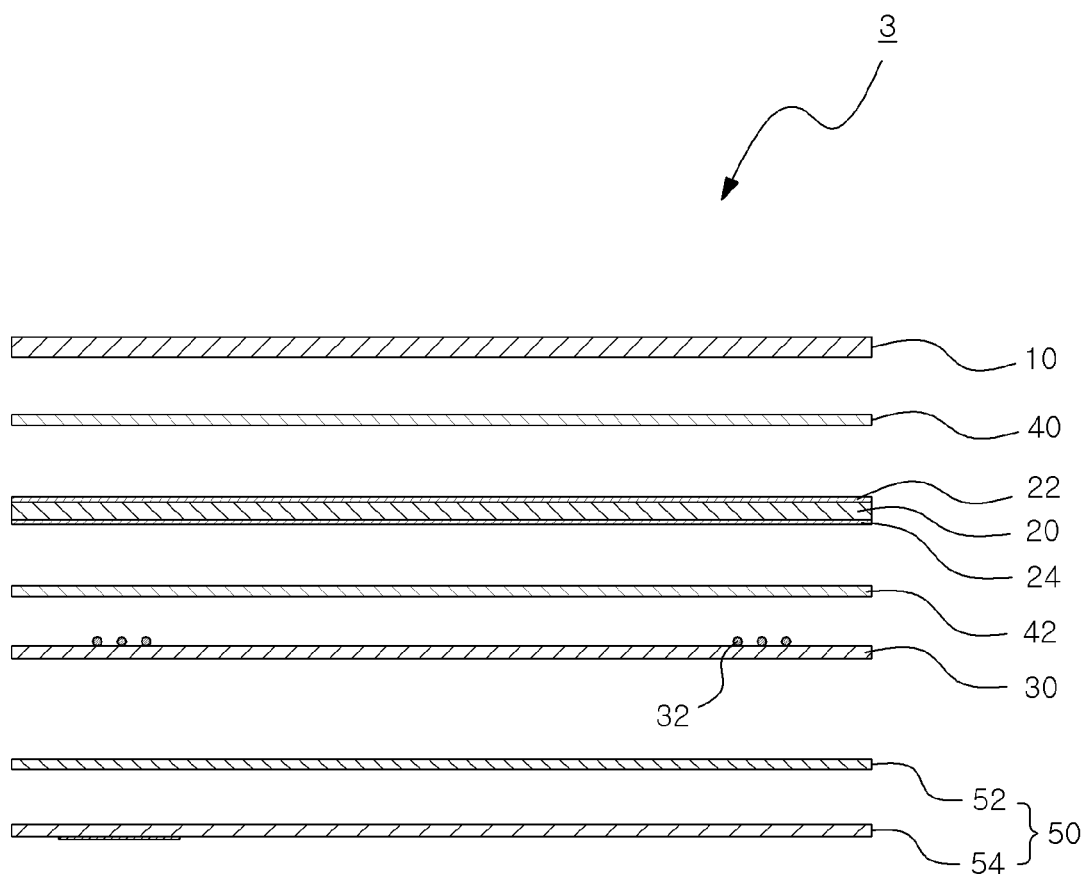
FIG. 5 is a cross-sectional view taken along line B-B of FIG. 4.

Referring to FIGS. 4 and 5, a contactless-type metal card 3 according to the second embodiment of the present invention includes a metal body sheet 10, an electromagnetic wave absorption sheet 20, an antenna inlay sheet 30, an IC device for card 90, first and second thermal adhesive sheets 40 and 42, and a back sheet assembly 50. The back sheet assembly 50 is configured with a single layer or a plurality of layers of sheets made of a synthetic resin material and is disposed to be adhered to the back surface of the antenna inlay sheet by heating and pressing. The contactless-type metal card 3 according to the present embodiment is characterized in that the back sheet assembly 50 is further provided on the contactless-type metal card 1 or 2 according to the first embodiment. Accordingly, in the contactless-type metal card 3 according to the present embodiment, other components except for the back sheet assembly 50 are the same as the corresponding components of the contactless-type metal card 1 or 2 according to the first embodiment, and thus, redundant description of the same components is omitted.

The back sheet assembly 50 may include one or two of a back print sheet 52 and a back overlay sheet 54. The back print sheet 52 is a sheet on which a pattern is printed on one side thereof. The back print sheet 52 is preferably made of a synthetic resin material. The back overlay sheet 54 is a sheet for protecting the back surface of the contactless-type metal card. The back overlay sheet 54 is preferably made of a transparent synthetic resin material. The synthetic resin material in the present specification may be one of polyvinyl chloride (PVC), polyethylene terephthalate (PET), polyethylene terephthalate glycol (PET-G), and polycarbonate (PC). Referring to FIGS. 4 and 5, with respect to the contactless-type metal card 3 according to the present embodiment, illustrated is a case where a dual interface IC device 92 is mounted as an IC device for card 92. However, the IC device for non-contacting card may be mounted as the IC device for card as needed. In this case, as illustrated in FIG. 1, the IC device for card may be mounted on the antenna inlay sheet 30.

Third Embodiment

Figure 6:
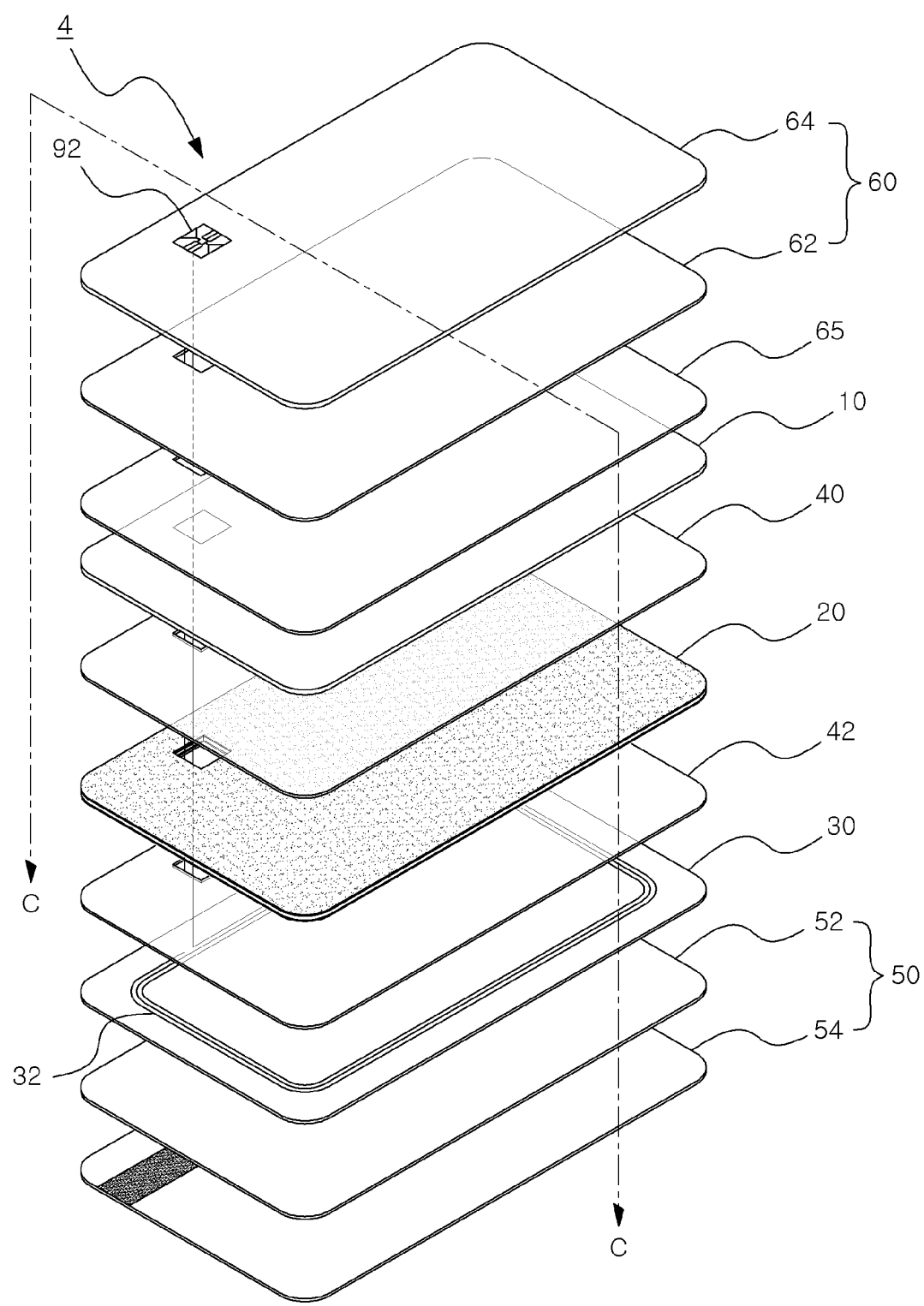
FIG. 6 is an exploded perspective view of a contactless-type metal card according to a third embodiment of the present invention.

Hereinafter, a structure and operations of a contactless-type metal card according to a third embodiment of the present invention will be described in detail with reference to FIGS. 6 and 7. FIG. 6 is an exploded perspective view of the contactless-type metal card according to the third embodiment of the present invention, and FIG. 7 is a cross-sectional view taken along line C-C of FIG. 6.

Figure 7:
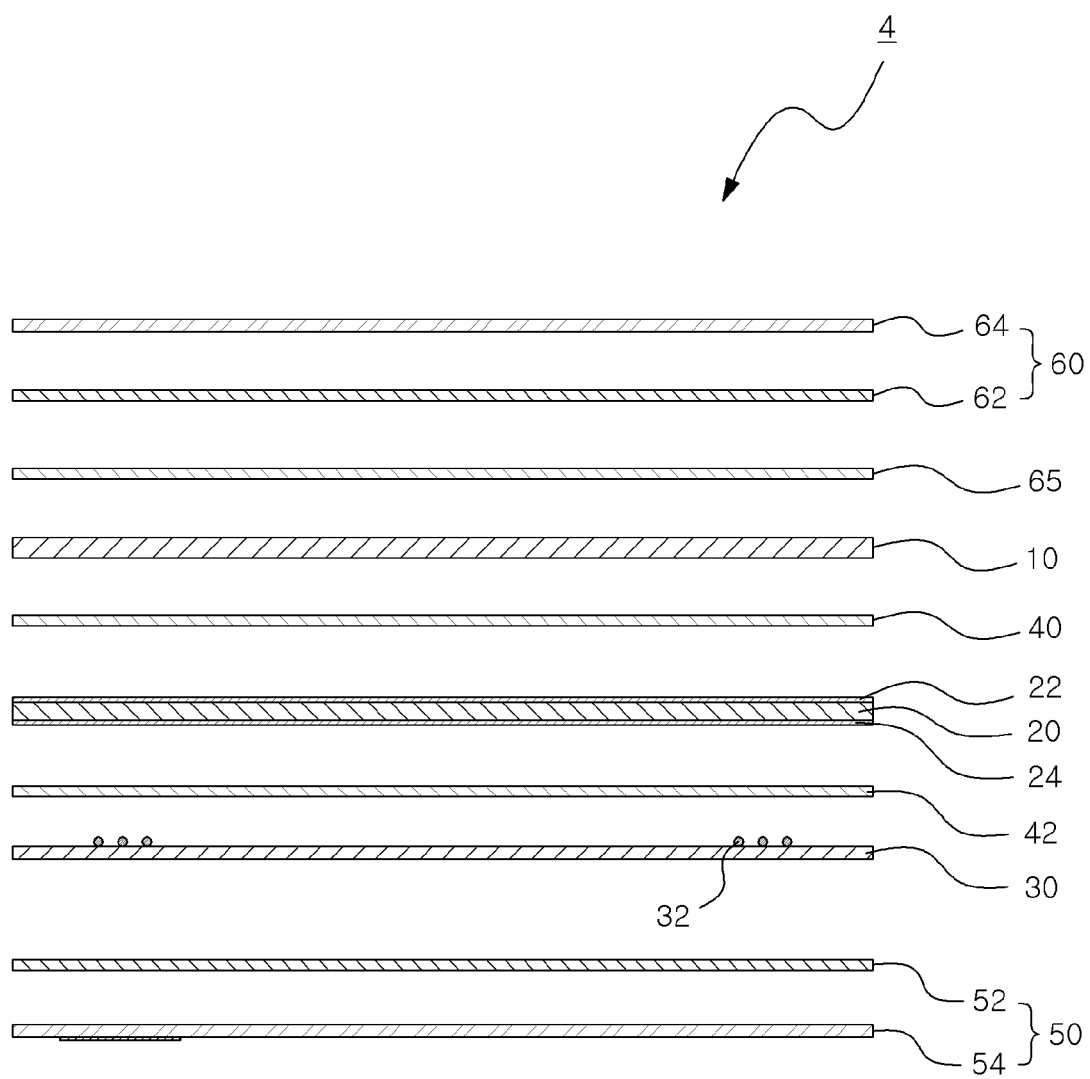
FIG. 7 is a cross-sectional view taken along line C-C of FIG. 6.

Referring to FIGS. 6 and 7, a contactless-type metal card 4 according to the third embodiment of the present invention includes a metal body sheet 10, an electromagnetic wave absorption sheet 20, an antenna inlay sheet 30, an IC device for card 90, first and second thermal adhesive sheets 40 and 42, front sheet assembly 60, third thermal adhesive sheet 65, and a back sheet assembly 50. The front sheet assembly 60 is configured with a single layer or a plurality of layers of sheets made of a synthetic resin material and is disposed to be adhered to the front surface of the metal body sheet by heating and pressing through the third thermal adhesive sheet 65. The third thermal adhesive sheet 65 is disposed between the front sheet assembly 60 and the metal body sheet 10 so that the front sheet assembly and the metal body sheet are stably adhered to each other by heating and pressing.

In addition, the back sheet assembly 50 is configured with a single layer or a plurality of layers of sheets made of a synthetic resin material and is disposed on the back surface of the antenna inlay sheet by heating and pressing. The contactless-type metal card 4 according to the present embodiment is configured to further include a front sheet assembly 60 and a back sheet assembly 50 on the front and back surfaces of the contactless-type metal card 1 or 2 according to the first embodiment, respectively. Accordingly, in the contactless-type metal card 4 according to the present embodiment, other components except for the front sheet assembly 60, the back sheet assembly 50, and the third thermal adhesive sheet 65 are the same as the corresponding components of the contactless-type metal card 1 or 2 according to the first embodiment, and thus, redundant description of the same components is omitted.

The front sheet assembly 60 may include one or both of a front print sheet 62 and a front overlay sheet 64. The front print sheet 62 is a sheet on which a pattern is printed on one side thereof. The front print sheet 62 is preferably made of a synthetic resin material. The front overlay sheet 64 is a sheet for protecting an exposed surface of the contactless-type metal card or an exposed surface of the metal body sheet. The front overlay sheet 64 is preferably made of a transparent synthetic resin material.

The back sheet assembly 50 may include one or both of a back print sheet 52 and a back overlay sheet 54. The back print sheet 52 is a sheet on which a pattern is printed on one side thereof. The back print sheet 52 is preferably made of a synthetic resin material. The back overlay sheet 54 is a sheet for protecting an exposed back surface of the contactless-type metal card or an exposed back surface of the antenna inlay sheet. The back overlay sheet 54 is preferably made of a transparent synthetic resin material.

Referring to FIGS. 6 and 7, the contactless-type metal card 4 according to the present embodiment, illustrated is a case where a dual interface IC device 92 mounted as an IC device for card 92. However, the IC device for non-contacting card may be mounted as the IC device for card as needed. In this case, as illustrated in FIG. 1, the IC device for card may be mounted on the antenna inlay sheet 30.

While the present invention has been particularly illustrated and described with reference to exemplary embodiments thereof, it should be understood by the skilled in the art that the invention is not limited to the disclosed embodiments, but various modifications and applications not illustrated in the above description can be made without departing from the spirit of the invention. In addition, differences relating to the modifications and applications should be construed as being included within the scope of the invention as set forth in the appended claims.

What is claimed is:

1. A contactless-type metal card embedded with an antenna, comprising:
    a metal body sheet made of a metal material and having a flat plate shape;
    an antenna inlay sheet of which main body is made of a synthetic resin material and in which an antenna is mounted on one side thereof;
    an electromagnetic wave absorption sheet disposed between the metal body sheet and the antenna inlay sheet; and
    an Integrated Circuit (IC) device for a card mounted on the metal body sheet or the antenna inlay sheet and having terminals connected to two ends of the antenna to be driven by an induced current supplied from the antenna,
    wherein the electromagnetic wave absorption sheet is a sheet prepared by mixing a powder of materials having a property of absorbing an electromagnetic wave and a binder and having a predetermined thickness.

2. The contactless-type metal card according to claim 1, wherein the electromagnetic wave absorption sheet is configured by mixing 1 to 10 wt % of silicon (Si), 1 to 10 wt % of chromium (Cr), 70 to 90 wt % of iron (Fe), and 5 to 15 wt % of the binder.

3. The contactless-type metal card according to claim 2, wherein the binder is made of a urethane resin.

4. The contactless-type metal card according to claim 1, further comprising:
    a first thermal adhesive sheet having a property of being adhered by heating and pressing and disposed between the metal body sheet and the electromagnetic wave absorption sheet; and
    a second thermal adhesive sheet having a property of being adhered by heating and pressing and disposed between the electromagnetic wave absorption sheet and the antenna inlay sheet.

5. The contactless-type metal card according to claim 1, further comprising adhesion enhancement layers made of a urethane-series resin on upper and lower surfaces of the electromagnetic wave absorption sheet to increase an adhesion strength of the electromagnetic wave absorption sheet.

6. The contactless-type metal card according to claim 1, further comprising a back sheet assembly including a single layer or a plurality of layers of sheets made of a synthetic resin material adhered to a back surface of the antenna inlay sheet by heating and pressing.

7. The contactless-type metal card according to claim 6, wherein the back sheet assembly includes one or two of:
    a back print sheet made of a synthetic resin material with a pattern printed on one side thereof; and
    a back overlay sheet made of a transparent synthetic resin material to protect a surface of the contactless-type metal card.

8. The contactless-type metal card according to claim 1, further comprising:
    a front sheet assembly configured with a single layer or a plurality of layers of sheets made of a synthetic resin material and disposed to be adhered to the back surface of the antenna inlay sheet by heating and pressing; and
    a third thermal adhesive sheet disposed between the front sheet assembly and the metal body sheet.

9. The contactless-type metal card according to claim 8, wherein the front sheet assembly includes one or two of:
    a front print sheet made of a synthetic resin material with a pattern printed on one side thereof; and
    a front overlay sheet made of a transparent synthetic resin material to protect a surface of the contactless-type metal card.

10. A contactless-type metal card comprising:
    a metal body sheet made of metal material;
    an antenna inlay sheet made of a synthetic resin material with an antenna mounted on one side thereof;
    an electromagnetic wave absorption sheet disposed between the metal body sheet and the antenna inlay sheet;
    an IC device for card mounted on the metal body sheet or the antenna inlay sheet and having terminals connected to two ends of the antenna to be driven by an induced current supplied from the antenna;
    a first thermal adhesive sheet having a property of being adhered by heating and pressing and disposed between the metal body sheet and the electromagnetic wave absorption sheet;
    a second thermal adhesive sheet having a property of being adhered by heating and pressing and disposed between the electromagnetic wave absorption sheet and the antenna inlay sheet; and
    a back sheet assembly configured with a single layer or a plurality of layers of sheets made of a synthetic resin material and disposed to be adhered to the back surface of the antenna inlay sheet by heating and pressing,
    wherein the electromagnetic wave absorption sheet is a sheet prepared by mixing a powder and a binder of materials having a property of absorbing an electromagnetic wave having a predetermined thickness.

11. The contactless-type metal card according to claim 10, wherein the electromagnetic wave absorption sheet is configured by mixing 1 to 10 wt % of silicon (Si), 1 to 10 wt % of chromium (Cr), 70 to 90 wt % of iron (Fe), and 5 to 15 wt % of the binder.

12. The contactless-type metal card according to claim 10, wherein the back sheet assembly includes one or two of:
    a back print sheet made of a synthetic resin material with a pattern printed on one side thereof; and
    a back overlay sheet made of a transparent synthetic resin material to protect a surface of the contactless-type metal card.

13. The contactless-type metal card according to 10, further comprising one or two of:
    a front sheet assembly configured with a single layer or a plurality of layers of sheets made of a synthetic resin material and disposed to be adhered to the front surface of the metal body sheet by heating and pressing; and
    a third thermal adhesive sheet disposed between the front sheet assembly and the metal body sheet,
    wherein the front sheet assembly includes one or two of:
    a front print sheet made of a synthetic resin material with pattern printed on one side thereof; and
    a front overlay sheet made of transparent synthetic resin material to protect a surface of the contactless-type metal card.

* * * * *